(12) United States Patent
Nguyen et al.

(10) Patent No.: US 7,443,909 B2
(45) Date of Patent: Oct. 28, 2008

(54) WEIGHTED AUTOCORRELATION METHOD FOR DOWNLINK CDMA LMMSE EQUALIZERS

(75) Inventors: Hoang Nguyen, Davis, CA (US);
Jianzhong Zhang, Irving, TX (US);
Yuanbin Guo, Richardson, TX (US);
Dennis McCain, Lewisville, TX (US);
Joe Dowling, Aughnacliffe (IE)

(73) Assignee: Nokia Corporation, Espoo (FI)

( * ) Notice: Subject to any disclaimer, the term of this patent is extended or adjusted under 35 U.S.C. 154(b) by 601 days.

(21) Appl. No.: 11/020,055

(22) Filed: Dec. 21, 2004

(65) Prior Publication Data

US 2006/0133462 A1 Jun. 22, 2006

(51) Int. Cl.
*H04B 1/707* (2006.01)

(52) U.S. Cl. .................. 375/150; 375/316; 375/147; 375/229; 375/232; 375/233; 375/234; 375/235; 375/236; 375/343

(58) Field of Classification Search .............. 375/316, 375/147, 150, 229, 232, 233, 234, 235, 236, 375/343

See application file for complete search history.

(56) References Cited

U.S. PATENT DOCUMENTS

| 5,790,598 | A * | 8/1998 | Moreland et al. ........... 375/233 |
| 7,076,259 | B2 * | 7/2006 | Belcea .................... 455/456.1 |
| 7,245,676 | B2 * | 7/2007 | Yui ........................... 375/343 |
| 2003/0095529 | A1 * | 5/2003 | Petre et al. .................... 370/342 |
| 2004/0223480 | A1 * | 11/2004 | Nguyen et al. .............. 370/342 |
| 2006/0034398 | A1 * | 2/2006 | Reznik et al. ............... 375/340 |

FOREIGN PATENT DOCUMENTS

WO   WO2006-088685   8/2006

OTHER PUBLICATIONS

Francis Bui et al., "Time-Varying Channel Modeling and Variable-Size Burst for Spatio-Temporal Interference Suppression in DS-CDMA Systems", Acoustics, Speech, and Signal Processing, 2004. Proceedings. IEEE International Conference, vol. 4, 17-21,IV981-984, May 2004.

Samina Chowdhury et al., "Application of Conjugate Gradient Methods in MMSE Equalization for the Forward Link of DS-CDMA", Vehicular Technology Conference, 2001. VTC 2001 Fall. IEEE VTS 54th, vol. 4, pp. 2434-2438.

(Continued)

*Primary Examiner*—Chieh M. Fan
*Assistant Examiner*—Siu M Lee
(74) *Attorney, Agent, or Firm*—Harrington & Smith, PC

(57) ABSTRACT

Receiving downlink CDMA signals in a fast-fading environment is facilitated at higher receiver velocities by updating the block-adaptive linear minimum mean square error (LMMSE) downlink CDMA equalizer. The autocorrelation matrix of the observed data is updated by passing block-wise autocorrelation slides through a filter. Each autocorrelation slide is an autocorrelation matrix estimated from a short block of observed data over which the channel can be considered constant. This method achieves a reliable estimate for the autocorrelation matrix when the block size must be small to ensure that the block-wise stationarity assumption holds in cases of fast fading channels. In addition, small block sizes make it possible to satisfy the equalizer delay constraint imposed by hardware and certain voice transmission standards such as CDMA2000 1X where demodulated data must be delivered within only several symbol periods of the signal arrival time.

22 Claims, 8 Drawing Sheets

OTHER PUBLICATIONS

Yagle, A., "A New Multichannel Split Levinson Algorithm for Block Hermitian—Toeplitz Matrices", Jun. 1989, pp. 928-931, IEEE Transactions on circuits and Systems, vol. 36, No. 6.

Ghauri, I., et al., "Linear Receivers for the DS-CDMA Downlink Exploiting Orthogonality of Spreading Sequences", 1998, pp. 650-654, IEEE.

Joshi, R. R., et al., "Split Versions of the Levinson-Like and Schur-Like Fast Algorithms for Solving Block-Slanted-Toeplitz Systems of Equations", Jul. 1998, pp. 2027-2030, IEEE Transactions on Signal Processing, vol. 46, No. 7.

Krauss, T.P., et al., "Simple MMSE Equalizers for CDMA Downlink to Restore Chip Sequence: Comparison to Zero-Forcing and Rake", 2000, pp. 2865-2868, IEEE.

Krauss, T.P., et al., "MMSE Equalization for Forward Link in 3G CDMA: Symbol-Level Versus Chip-Level", 2000, pp. 18-22, IEEE.

Nguyen, H., et al., "A Kalman-Filter Approach to Equalization of CDMA Downlink Channels", Nov. 9-12, 2003, pp. 1-27, $37^{th}$ Asilomar Conference on Signals, Systems, and Computers.

Zhang, J., et al., "Efficient Linear Equalizer for High Data Rate Downlink CDMA Signaling", 2003, pp. 141-145, IEEE.

De Baynast, Alexandre, et al., "Chip-level LMMSE Equalization for Downlink MIMO CDMA in Fast Fading Environments", 2004, IEEE, pp. 2552-2556.

Hu, Chia-Chang, et al., "Asynchronous Multiple-Access Interference Suppression Using Variable Block Adaptive Filtering in Time-Varying Multipath Channels", 2005 IEEE, pp. 17-21.

* cited by examiner

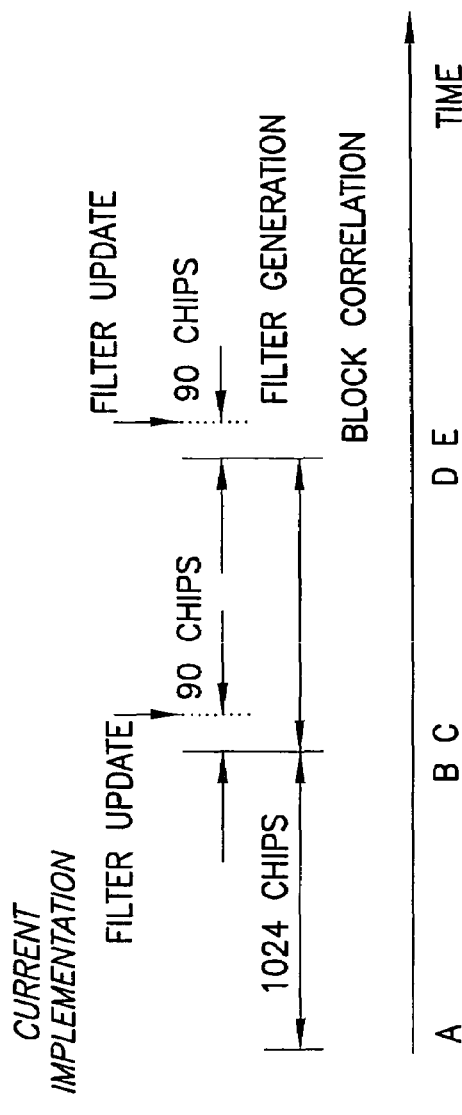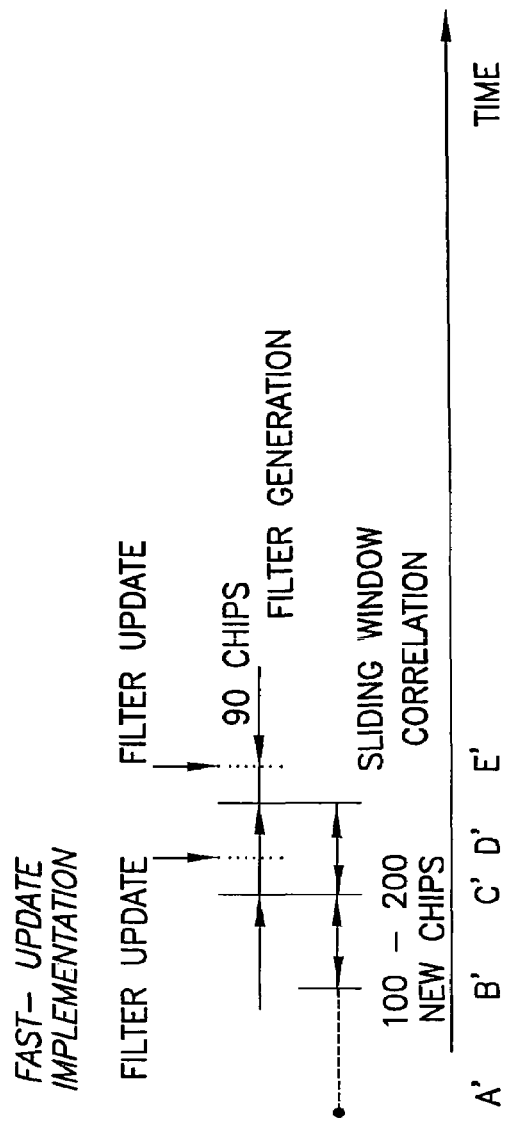

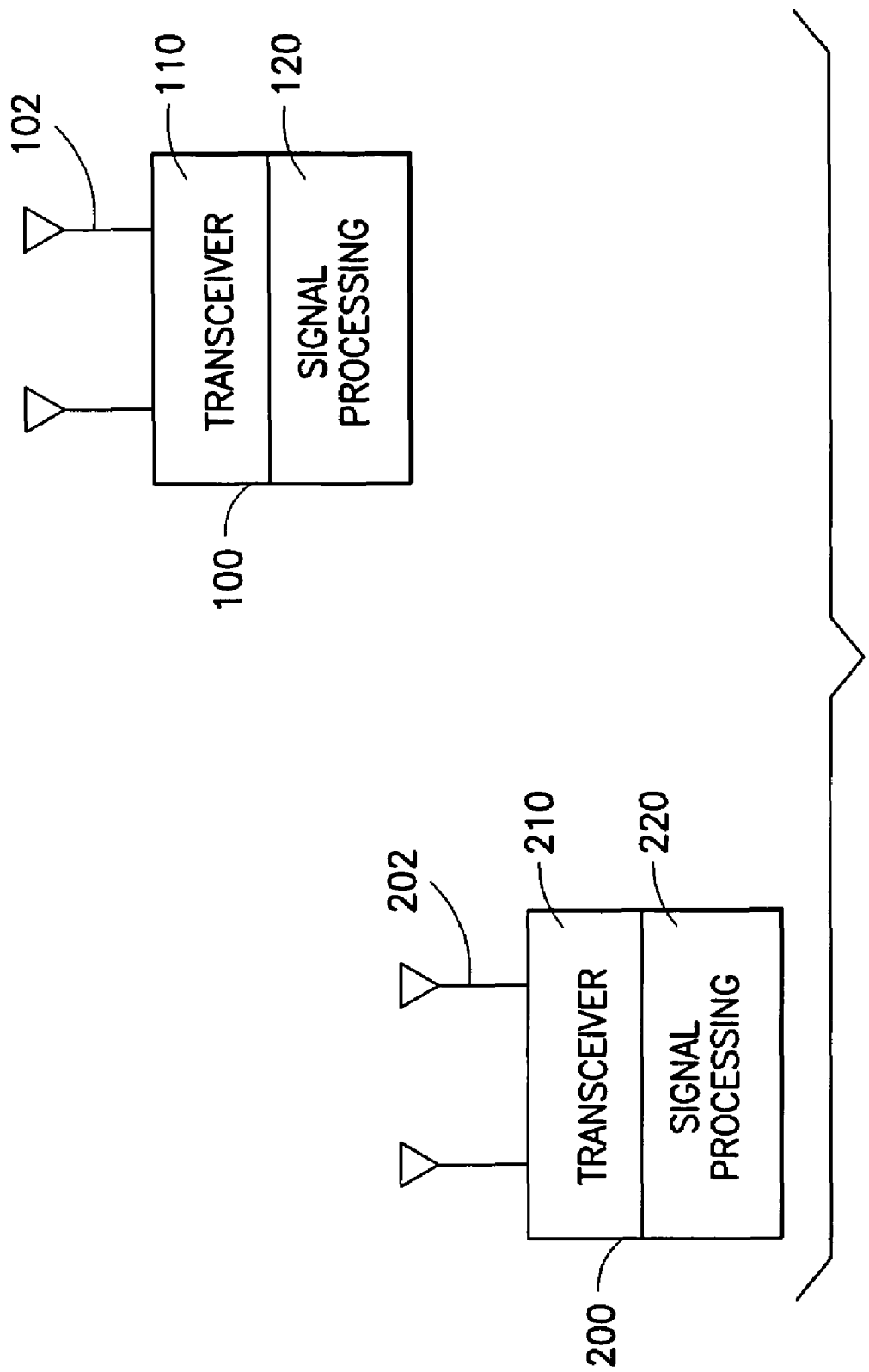

WEIGHTED AUTOCORRELATION METHOD FOR DOWNLINK CDMA LMMSE EQUALIZERS

TECHNICAL FIELD

The field of the invention is that of CDMA wireless signals transmitted from base station to a mobile terminal.

BACKGROUND OF THE INVENTION

Downlink CDMA signals transmitted over wireless channels are subject to fading and distortions due to multipath propagation. This is a well known problem that has attracted a great deal of attention. It is desirable for the receiver to be capable of undoing the channel distortions and recovering the transmitted signal subject to an optimality criterion. Those skilled in the art are aware that various approaches to compensate for distortion referred to as channel equalization is limited by practical considerations such as the amount of computing power that can be placed in the receiver and the time to carry out calculations.

Downlink CDMA receivers typically are a linear minimum mean squared error (LMMSE) equalizer, which performs the task of recovering the transmitted signal by minimizing the mean squared error between the transmitted signal and the estimated version of the signal.

To facilitate the discussion, we refer to FIG. 1. FIG. 1A, in the upper half of the figure depicts a prior art implementation of the block-adaptive LMMSE equalizer. In this conventional implementation, an equalizer value is computed exclusively from each block of data and is used to equalize the next block, e.g. the equalizer value for the (n+1)th block depends only on the nth block. For example, the data observed between points A and B are employed to evaluate the filter update that takes effect at time C.

The 90-chip delay between points B and C accounts for the computing time required by the hardware. The new filter is used to equalize the signal received after time C up to time E where the next filter update occurs. This implementation suffers from the "obsolescence" issue. In fast fading environments, the channel impulse response during the C-E interval is completely different from that during the A-B interval.

As a result, the equalizer designed during the current block becomes outdated for the next block. One way to resolve this problem could be to bring points A and E closer together so that they lie within a fraction of the channel's coherence time from each other. Doing so, however, shortens the block length and the equalizer estimate becomes unreliable.

Alternatively, we could, with the use of a data buffer, equalize each block by using the equalizer estimated from the same block. Unfortunately, this method introduces a demodulation delay that may exceed the maximum allowed by delay-sensitive applications such as voice transmission.

Without the one-block filtering delay, the block-adaptive LMMSE equalizer performs well and is widely accepted in the literature: I. Ghauri and D. T. M. Slock, "Linear receivers for the DS-CDMA downlink exploiting orthogonality of spreading sequences," in Proc. 32$^{nd}$ Asilomar Conf. Signals, Systems, Computers, vol. 1, pp. 6506-654, 1-4 Nov. 1998 [1]; T. P. Krauss, W. J. Hillery, and M. D. Zoltowsky, "MMSE equalization for forward link in 3G CDMA: symbol-level versus chip-level," Tenth IEEE workshop on Stat. Signal and Array Proc., 2000.[2]; J. Zhang, T. Bhatt, and G. Mandyam, "Efficient linear equalization for high data rate downlink CDMA signaling," 37th Asilomar Conference on Signals, Systems and Computers, Pacific Grove, Calif. 9-12 Nov. 2003.[3]; T. P. Krauss, M. D. Zoltowski, and G. Leus, "Simple MMSE equalizers for CDMA downlink to restore chip sequence: comparison to zero-forcing and RAKE," in Proc. IEEE Int. Conf. Acoustics, Speech, Signal Processing, vol. 5, pp. 2865-2868, 5-9 Jun. 2000 [4]. In the following discussion, numerals in square brackets [i] relate to references and numerals in parentheses relate to equations (n).

However, when the delay is present, the equalizer performance becomes severely limited and this issue has been given little attention. Note that filtering delay here refers to the time difference between the newest data point contributing to the current equalizer value and the newest data point that gets passed through that equalizer. For example, with reference to paragraphs [0004] and [0005], point B in FIG. 1A is the newest data point that contributes to the filter that takes effect at point C in FIG. 1A; point E in FIG. 1A is the newest data point that gets passed through this filter; thus, the time elapsed between points B and E represents the filtering delay. Demodulation delay here means the time difference between the newest equalized data point and the newest un-equalized data point at the receiver input at any instant; this delay essentially indicates the amount of un-equalized backlog data before the equalizer.

In previous work, e.g. [1], [2], [3], [4], the block-adaptive LMMSE equalizer was implemented with a data buffer to avoid the filtering delay. As described above, each data block is stored in a buffer while the equalizer is being synthesized from this data. When the synthesis is completed, the data is pushed out of the buffer and passed through that newly synthesized equalizer. This method introduces too large a demodulation delay that may be unacceptable for certain applications such as live voice transmission. The demodulation delay can be reduced by allowing a filtering delay or by shortening the block size. Unfortunately, this scheme reduces the adaptive capability of the LMMSE equalizer under high mobility conditions, or decreases the reliability of the filter estimate due to shrunken sample size.

SUMMARY OF THE INVENTION

The invention relates to a new technique for block-adaptive computation of the autocorrelation matrix associated with block-adaptive LMMSE equalizers.

A feature of the invention is the use of a series of blocks of data that are earlier in time. Another feature of the invention is the weighting of earlier data less than more recent data. Specifically, the present invention adapts block size to the coherence interval of signals received over the channel, and is particularly advantageous in fast-fading channels. To offset the smaller block size in rapidly fading channels, the present invention uses a longer "look-back" of previously received blocks to stabilize the autocorrelation matrix and equalizer as compared to that used when the channel is slowly fading. The aged samples of received blocks are weighted differentially to reflect their relevance to the current channel conditions.

According to a particular embodiment is a method of dynamically adjusting a filter in a receiver for changing channel conditions. The method includes receiving a first block of signals over at least one channel; estimating a first correlation matrix for the first block of signals once in an update period $P_1$, the first correlation matrix correlating data from a total of nj blocks of signals; equalizing the first block of signals using the first correlation matrix; receiving a second block of signals over the at least one channel; determining that a coherence interval between the second block of signals and a block of signals received immediately prior to the second is shorter than a coherence interval between the first block of signals and a block of signals received immediately prior to the first; estimating a second correlation matrix for a second block of received signals once in an update period $P_2$, the first correlation matrix correlating data from a total of $n_2$ blocks of data, where $P_2$ is shorter than $P_1$ and $n_2$ is greater than $n_1$; and equalizing the second block of signals using the second correlation matrix.

BRIEF DESCRIPTION OF THE DRAWINGS

FIG. 1A illustrates a prior art filter update scheme for block LMMSE equalization.

FIG. 1B illustrates a method according to the invention.

FIG. 8 illustrates schematically a system according to the invention.

BEST MODE OF CARRYING OUT THE INVENTION

Figure 2:
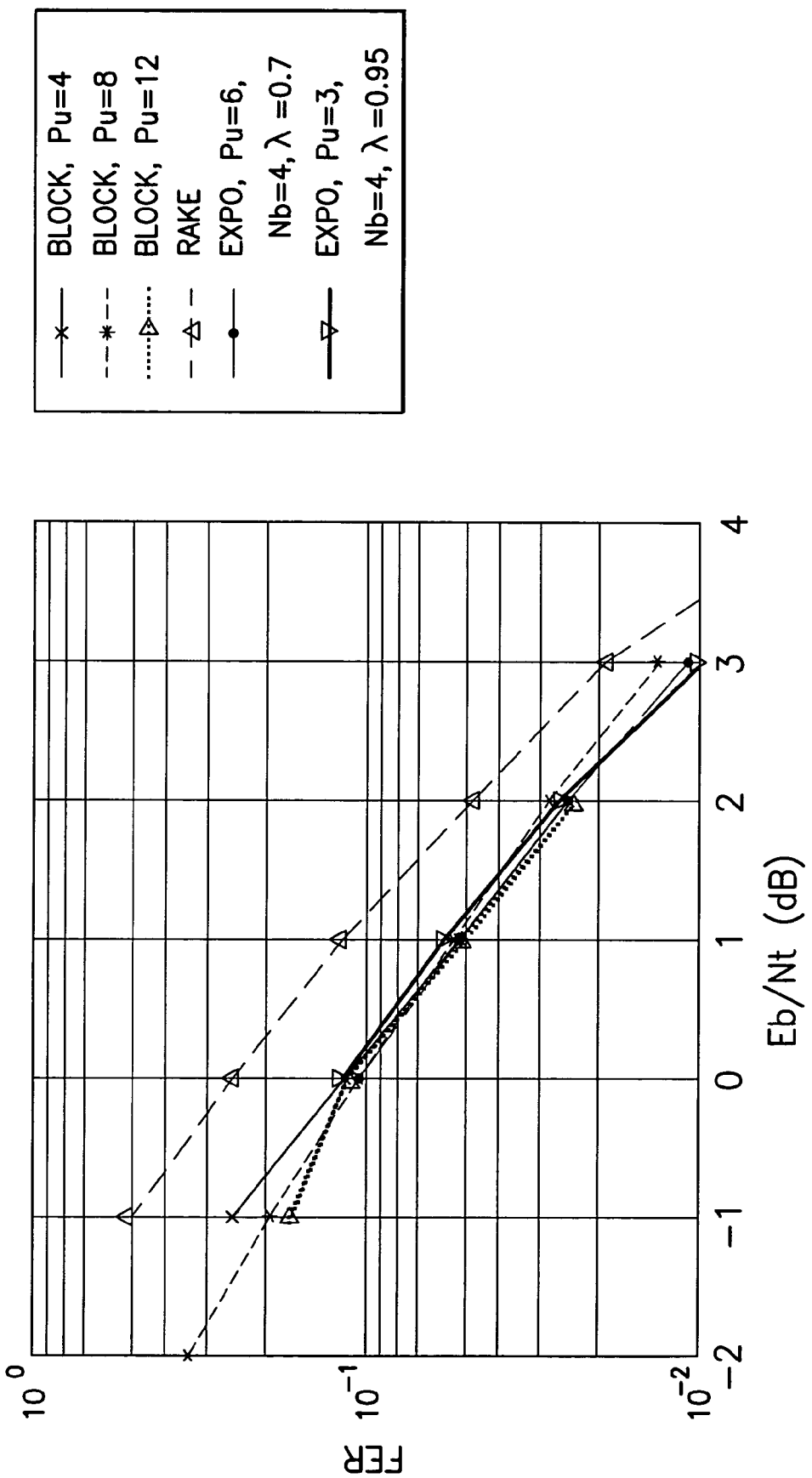
FIG. 2 illustrates: 1× performances for the 2-path IS-98 channel with v=8 km/h and G=6 dB.

This invention reduces or removes the filtering and demodulation delays existing in block-adaptive LMMSE equalizers, enhances the adaptive capability of block-adaptive LMMSE equalizers, and allows for a flexibility in selecting a proper block size suitable for a given hardware computing speed, tracking and adaptability requirement.

For convenience in illustration, FIG. 8 shows a simplified version of a wireless telecommunications system, in which a base station 100 has at least one antenna 102 connected to a transceiver 110 that is connected to a signal processing module 120 that performs conventional baseband functions, such as demodulating, descrambling and the equalizer updating steps shown here.

To facilitate the discussion, we refer to FIG. 1B where a fast filter update scheme according to the invention is depicted. The filter update occurring at time D' is computed from the observed data obtained up to time C'. This filter remains in effect until the next update which occurs at time E'. This implementation differs from the previous one in two respects. First, to avoid the obsolescence issue, the block span D'-E' is small relative to the channel's coherence time, meaning that the channel parameters are essentially unchanged in that time. Also, since the block size is reduced, the way in which past observed data is utilized in computing the filter update is improved in order to achieve a reliable filter estimate.

Specifically, within each small block, an estimate of the autocorrelation matrix, called a slide, is obtained by sample averaging. The sequence of slides is then passed through a filter to obtain the final estimate of the autocorrelation matrix to be used in the filter update. The autocorrelation filter is designed in such a way that it puts a greater importance on more recent data and vice versa.

The resulting algorithm is best implemented similarly to most equalization algorithms for wireless receivers. The associated equalizer has the same structure as the ordinary LMMSE equalizer and, hence, the same general form of implementation thereof should be considered. The inventive method can be incorporated in any existing LMMSE equalizer design and requires only a small amount of additional storage and computing elements. Typically, this algorithm can be implemented in software form to be embedded in a general-purpose signal processing chip. A computationally faster alternative would be to implement it in a special-purpose chip.

For simplicity, we consider here a multiple-input single-output (MISO) system with one transmit antenna and N receive antennas, although the proposed method is applicable also to the case of multiple transmit antennas without modification.

Consider a U-user system where the transmitted signal of the $u^{th}$ user is represented by $$x_u(i) = A_u \alpha_u(\lfloor i/F \rfloor) s_u(|i|_F) \quad (1)$$

where i and F are the chip index and the spreading gain, respectively. Here, $\lfloor \cdot \rfloor$ and $|\cdot|_F$ respectively represent the floor function and the modulo-F reduction. For the $u^{th}$ Walsh channel, the sequence of transmitted symbols is denoted by $\alpha_u(k)$ and the associated Walsh spreading code by $s_u(k)$. The amplitude $A_u$ determines the amount of power assigned to the $u^{th}$ Walsh channel and may be varied by power-control operations. The total transmitted signal x(i) is the sum of all user signals scrambled by the scrambling sequence c(i) so that $$x(i) = c(i) \sum_{u=1}^{U} x_u(i). \quad (2)$$

The signal impinging upon the $r^{th}$ receive antenna is given by $$y_r(i) = [h_{r,0}(i), \ldots, h_{r,D}(i)] \begin{bmatrix} x(i) \\ \vdots \\ x(i-D) \end{bmatrix} + v_r(i) \quad (3)$$

$$= h_r^T(i) x(i) + v_r(i) \quad (4)$$

where $$h_r(i) \equiv [h_{r,0}(i), \ldots, h_{r,D}(i)]^T \quad (5)$$

$$x(i) \equiv [x(i), \ldots, x(i-D)] \quad (6)$$

for r=1, ..., N.

Here, $h_{r,l}$ denotes the lth tap of the channel impulse response between the transmit antenna and the rth receive antenna. The superscript T denotes matrix transposition; e.g., $x^T(i)$ is the transpose of x(i). The measurement noises $v_r(i)$ are assumed to be i.i.d. white Gaussian processes such that $E[v_r(k)v_s^*(l)] = \delta_{r-s}\delta_{k-l}\sigma_v^2$ where $\delta_k$ denotes the Kronecker delta function. We note that the same signal model holds for over sampling where the number of output dimensions N is increased by a factor equal to the over sampling factor.

The class of chip finite impulse response (FIR) LMMSE equalizers minimizes the mean squared error (MSE) criterion $$J(i; G_i) \equiv E[e_i^2] \quad (7)$$

where $$e_i \equiv x(i) - \hat{x}(i) \quad (8)$$

and $\hat{x}(i)$ is the LMMSE estimate of $x(i)$ obtained by passing the observations through a multidimensional FIR filter. That is, $$\hat{x}(i)=G_i y_i \quad (9)$$

where $$y_i \equiv [y^T(i+\delta),\ldots,y^T(i+\delta-L)]^T \quad (10)$$

$$y(i) \equiv [y_1(i),\ldots,y_N(i)]^T \quad (11)$$

Here, L and δ are design parameters representing the equalizer order and the number of precursor (or noncausal) taps, respectively. The MSE in (7) is to be optimized over the 1×(L+1)N vector $G_i$, i.e., $$G_i = \underset{G}{\mathrm{argmin}}\, J(i;G). \quad (12)$$

This minimization yields the product of a cross correlation matrix and the inverse of an autocorrelation matrix.

$$G_i = R_{xy}(i) R_i^{-1} \quad (13)$$

with $$R_{xy}(i) \equiv E[x_i y_i^H],\ \text{the cross correlation matrix} \quad (14)$$

$$R_i \equiv E[y_i y_i^H],\ \text{the autocorrelation matrix}. \quad (15)$$

Since the channel impulse response can be estimated from the pilot data, the cross-correlation (14) is easy to compute. We summarize the explicit form of (14) as follows without derivation details. With the assumption that the transmitted signal is chip-white, i.e., $$E[x(k)x^*(l)] = \delta_{k-l} \sigma_x^2, \quad (16)$$

where $\tau_x^2 \equiv E[|x(i)|^2]$ is the total power of the transmit antenna, we have $$R_{xy}(i) \equiv [V(\delta) H^H(i+\delta),\ldots,V(\delta-L) H^H(i+\delta-L)]:1\times(L+1)N \quad (17)$$

with $$V(l) \equiv \begin{cases} \left[0,\ldots,0,\underset{l+1\text{st position}}{\sigma_x^2},0,\ldots,0\right], & \text{for } 0 \leq l \leq D \\ 0, & \text{otherwise} \end{cases} \quad (18)$$

$$1 \times (D+1)$$

$$H(i) \equiv [h_1(i),\ldots,h_N(i)]^T : N \times (D+1). \quad (19)$$

Note that V(l) is nonzero only when $0 \leq l \leq D$. Within each processing block, the channel is assumed constant so that the channel matrices $H(i+\delta),\ldots,H(i+\delta-L)$ in (17) can be assigned a typical value such as H(i).

Our objective here is to devise a method for updating $R_i$ in order to improve performance of the LMMSE equalizer (13) subject to the delay constraints described above. In the prior art block-adaptive LMMSE approach [1], [2], [3], [4], the autocorrelation matrix $R_i$ is assumed to hold constant over each update period of $P_u$ chips. With this assumption, $R_i$ is estimated by $$R(n) = \begin{bmatrix} r_n(0) & \cdots & r_n(D) & 0 & \cdots & 0 \\ \vdots & \ddots & & \ddots & \ddots & \vdots \\ r_n^H(D) & & r_n(0) & & \ddots & 0 \\ 0 & \ddots & & r_n(0) & & r_n(D) \\ \vdots & \ddots & \ddots & & \ddots & \vdots \\ 0 & \cdots & 0 & r_n^H(D) & \cdots & r_n(0) \end{bmatrix} \quad (20)$$

where the block index is denoted by $n \geq 0$ and the lag-l autocorrelation of the observation is estimated by the sample average $$r_n(l) = \frac{1}{P_u} \sum_{k=0}^{P_u-1} y(nP_u + k + l) y^H(nP_u + k) \text{ for } l = 0, 1, \ldots, D. \quad (21)$$

The main issue in this prior art approach is that if R(n) is used in place of $R_i$, for $i=nP_u, nP_u+1,\ldots,(n+1)P_u-1$, and the resulting equalizer (13) is used to filter the (n+1)th block, instead of the nth block, the receiver performance becomes unacceptable in cases of high mobile speeds.

Such dramatic degradation in performance results from the fact that the equalizer designed based on the nth block quickly becomes outdated for the (n+1)th block. Faster tracking of R(n) could be achieved by decreasing the block size $P_u$. The downside of that approach of decreasing $P_u$ is that the sample average (21) becomes unreliable, which severely limits the receiver performance.

Thus, we face a classic dilemma where the reliability of sample averages and the tracking speed have opposite effects on the equalizer.

To resolve this issue, we recognize that all data received prior to time n is relevant, to various degrees, to the equalizer value to be synthesized at time n+1.

Therefore, according to the invention, a better estimate for $R_i$ can be obtained by passing R(n) through a multidimensional filter in which the autocorrelation matrix is the central element in a matrix product that places R between F and $F^H$, the hermitian of F, to obtain $$\hat{R}(n) = \sum_{k=0}^{N_b-1} F(k) R(n-k) F^H(k) \quad (22)$$

where $N_b$ is a design parameter which determines the amount of past data in the current filter synthesis and F(k) is a nonsingular matrix having the same size as R(k). Illustratively, k indexes the matrix-valued filter taps F(k) and $N_b$ is the number of slides in each filter synthesis. There may be about 10 slides in a synthesis.

We see from (22) that the sample size for $\hat{R}(n)$ is $N_b P_u$ chips, which is $N_b$ times the block size $P_u$. Therefore, we can decrease the demodulation delay by decreasing the block size. At the same time, to keep $\hat{R}(n)$ reliable, we increase its sample size by increasing $N_b$.

Although maximizing the receiver performance over F(k) is computationally difficult, we have observed that the diagonal form $$F(k) = \lambda^{k/2} I \quad (23)$$

works reasonably well for some forgetting (attenuating) factor $\lambda \in (0,1]$. This filter form puts smaller weights on older autocorrelation slides and larger weight on newer ones. For example, when $\lambda = \frac{1}{2}$ we have from (22):

$$\hat{R}(n) = R(n) + \frac{1}{2} R(n-1) + \ldots + \frac{1}{2^{N_b-1}} R(n - N_b + 1). \quad (24)$$

We note that more general filter forms such as a one-sided tapering window can be substituted for the exponential form (23). For example, a quadratically decreasing filter $$F(k) = \frac{1}{(1+k)^2} I, \, k \geq 0 \quad (25)$$

is also valid.

In general, the form of $F(k)$ should be such that its spectral radius decreases monotonically with k so that older data carries a small weight. As long as $N_b > 0$, recent past observations are allowed to contribute to the equalizer design at each block and the block size can be reduced in order to prevent the equalizer from becoming outdated.

The final estimate for $R_i$ is given by $$\hat{R}_i = \hat{R}(n) \quad (26)$$

for $i = nP_u, nP_u+1, \ldots nP_u + P_u - 1$.

We note that as an advantageous result of a one-dimensional filtering operation such as (23), $\hat{R}_i$ copies the block Hermitian-Toeplitz structure of $R(n)$ so that the FFT-based method of [3] can be employed to obtain an approximate inverse of $\hat{R}_i$; for a higher complexity, exact matrix inversion can be obtained by applying split Levinson algorithms A. E. Yagle, "A new multichannel split Levinson algorithm for block Hermitian-Toeplitz matrices," IEEE Trans. Circuits & Syst., vol 36, pp. 928-931, June 1989. [5]; R. R. Joshi and A. E. Yagle, "Split versions of the Levinson-like and Schur-like fast algorithms for solving block-slanted-Toeplitz systems of equations," IEEE Trans. Sig. Proc., vol 46, pp. 2027-2030, July 1998.[6] for block Hermitian-Toeplitz systems.

E. Yagle, "A new multichannel split Levinson algorithm for block Hermitian-Toeplitz matrices," IEEE Trans. Circuits & Syst., vol 36, pp. 928-931, June 1989. [5]; R. R. Joshi and A. E. Yagle, "Split versions of the Levinson-like and Schur-like fast algorithms for solving block-slanted-Toeplitz systems of equations," IEEE Trans. Sig. Proc., vol 46, pp. 2027-2030, July 1998.[6]

The method described above may be summarized as:

Receive input signals, grouped in blocks of chips, on at least one antenna;

synthesize parameters of an LMMSE equalizer having a cross-correlation matrix and an auto correlation matrix;

equalize the input signals from an nth block;

update the equalizer at each slide in the current block by estimating the channel autocorrelation matrix $R_i$ in a method that sums a matrix product $FRF^H$ over an update range of slides, where F depends on an attenuation factor, so that the autocorrelation matrix is weighted toward recent slides; and process the output of the equalizer to generate the transmitted data.

The general term "process the output of the equalizer" will be used to summarize conventional steps such as decode, descramble, etc.

In the following simulations, we compare the frame error rate (FER) performance of the LMMSE equalizer with that of the Rake receiver. For the LMMSE equalizer, the autocorrelation matrix is updated according to the exponential form (23) for various values of the window length $N_b$, update period (block length) $P_u$, and forgetting factor $\lambda$. Among many possible channel profiles, we elect to use the IS-98 multipath model having two paths, equal in strength and located approximately 2.5 chips apart. This channel profile represents a high intersymbol interference scenario due to the equal path strengths. In addition, the received signal is sampled at the rate of 4 samples per chip. The sampled signal is then down sampled to 2 samples per chip, where the reference time is selected in such a way that the chip-spaced sequence having the highest power is retained for the Rake receiver. The down sampled signal is then passed through the LMMSE equalizer, which has a span of L=21 taps. Of the 21 taps, $\delta$=10 taps are noncausal. To see the tracking capability of the proposed method, we test it at low, medium, and high mobile speeds.

We clarify that in the following figures, the update period $P_u$ is measured in symbols instead of chips for simplicity; i.e., the actual update period in chips is equal to the indicated value multiplied by the spreading gain.

These simulations are carried out under the RC3 radio configuration of the 1× voice standard, where the data rate is 9.6 kbps, chip rate 1.2288 mega chips per second and spreading gain 64 chips per QPSK modulated symbol. The overall receive signal to noise ratio is determined by the geometry factor which is fixed at G=6 dB. For the LMMSE equalizer, we allow a filtering delay equal to one block so that the equalizer synthesized from the data received up to block n is used to equalize future data contained in block n+1. Important parameters are shown in Table I.

TABLE I

1X Simulation parameters

| | | | |
|---|---|---|---|
| Standard | 1X | Channel model | 2-tap IS-98 |
| Radio Config. | RC3 | Mobile speed | 8, 50, 100 km/h |
| Data rate | 9.6 kbps | Equalizer span | 21 chips |
| DIR | −100 dB | Geometry | 6 dB |
| Spreading gain | 64 | Initial over sampling | 4 samples per chip |
| Chip rate | 1.2288 Mcps | LMMSE over sampling | 2 samples per chip |

Figure 3:
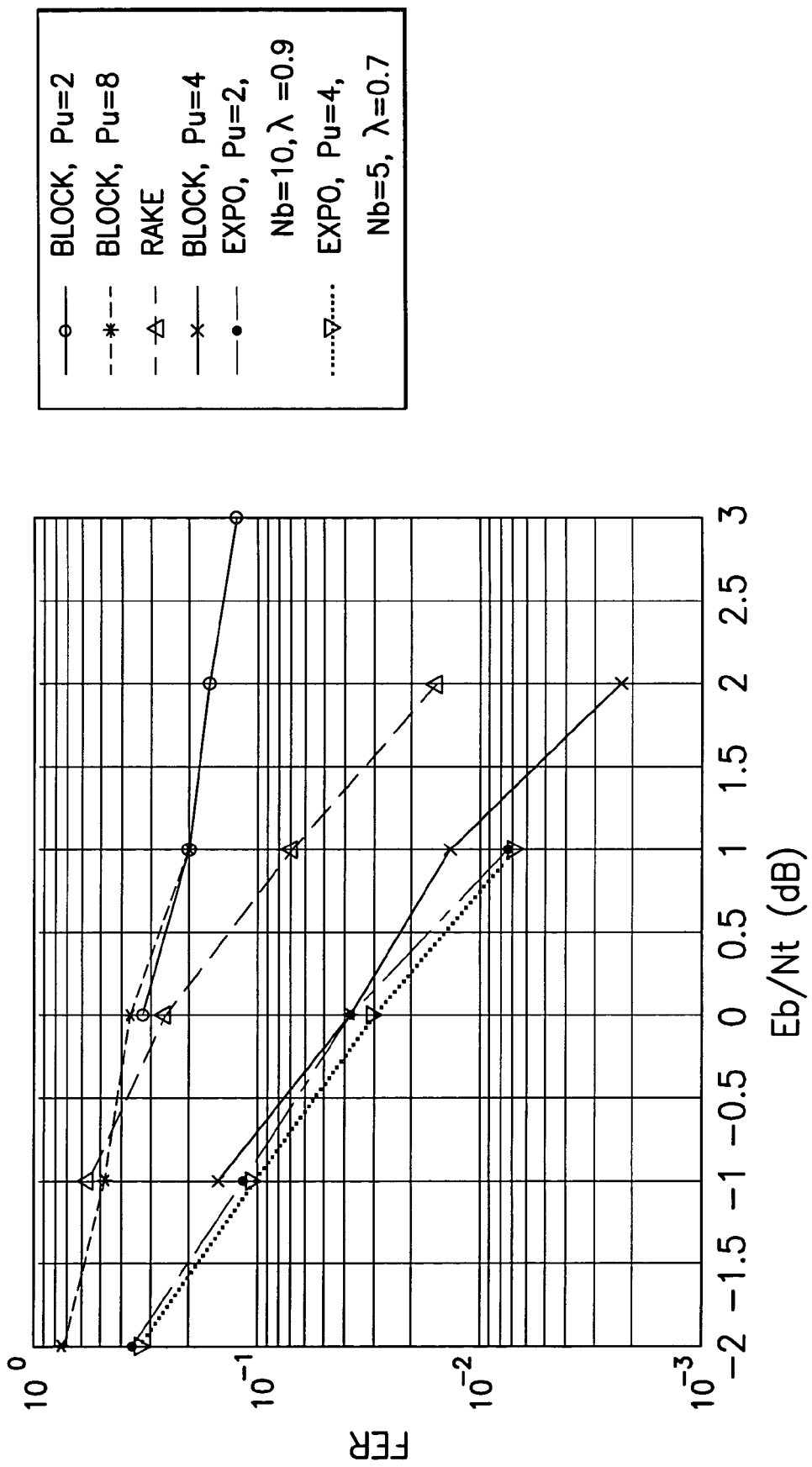
FIG. 3 illustrates: 1× performances for the 2-path IS-98 channel with v=50 km/h and G=6 dB.
Figure 4:
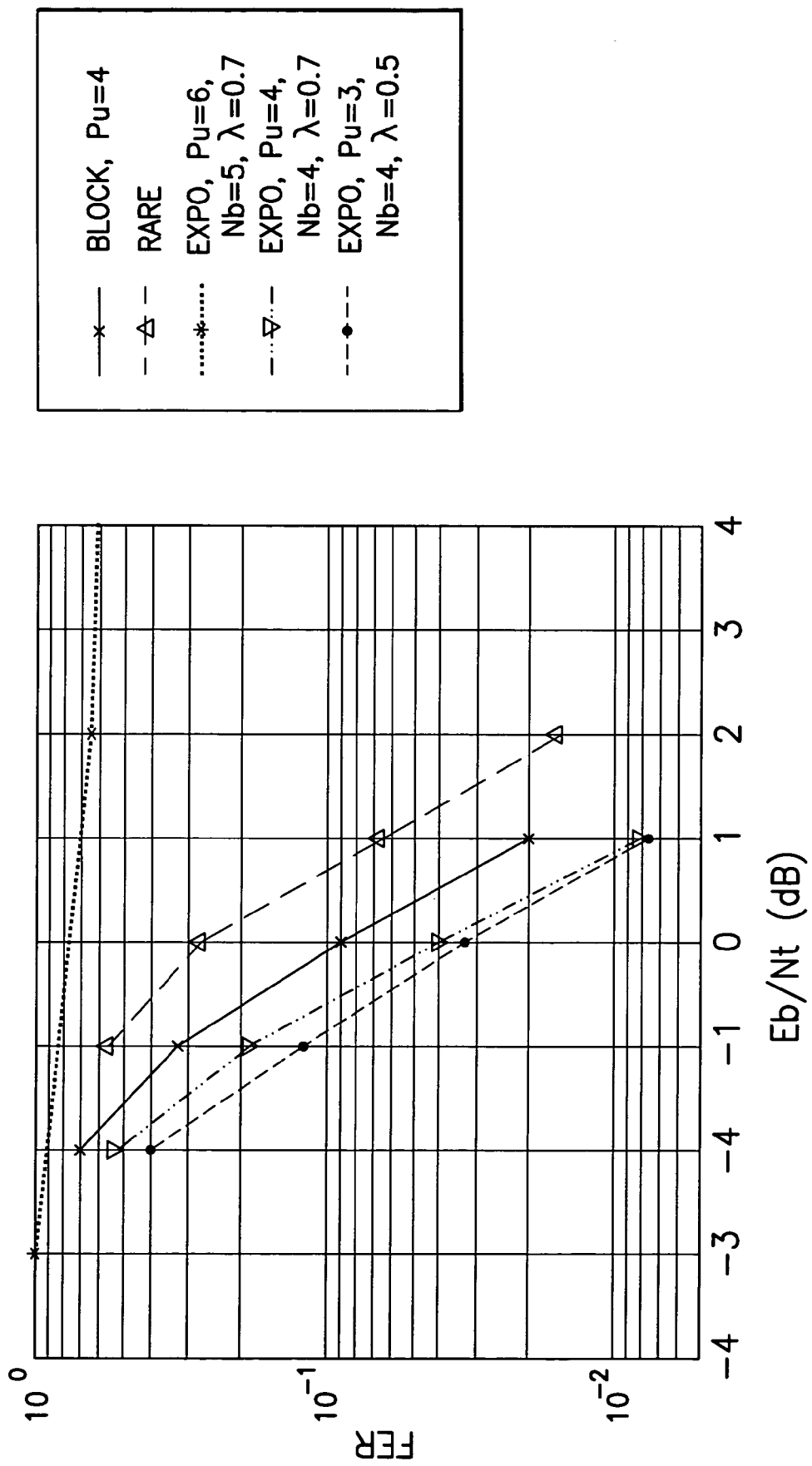
FIG. 4 illustrates: 1× performances for the 2-path IS-98 channel with v=100 km/h and G=6 dB.

From FIG. 2, where the vehicle speed is low, we see that the ordinary block LMMSE implementation (marked with "block") performs as well as the exponential form. In this implementation, the (n+1)th block is equalized by the filter synthesized from the data contained in the nth block only. We also see that the receiver performance is insensitive to $P_u$, as expected for low mobility. For medium to high speeds, FIGS. 3 and 4 show that $P_u$ drastically affects the performance of the ordinary block implementation.

On the other hand, the exponential WAU method is relatively insensitive to $P_u$. We have also observed that at high mobile speeds, the ordinary block implementation fails for any $P_u$.

These simulations are carried out under one slot format of the 1× EV-DV standard, where the data rate is 163.2 kbps, chip rate 1.2288 mega chips per second and spreading gain 32 chips per QPSK modulated symbol. Of the 32 available Walsh codes, 25 codes are used by various users and 1 by the pilot. Out of the total of the 25 Walsh codes, the desired user utilizes three of them. The channel is estimated from the pilot data which accounts for 20% of the total transmitted power. The remaining 80% of the power is distributed uniformly among the 25 Walsh channels.

Under the 1× EV-DV standard, we assume that a demodulation delay is allowable so that a data buffer can be utilized. The use of a buffer eliminates the filtering delay, i.e., the equalizer synthesized from data received up to the end of block n is used to equalize the observations contained in block n. Important parameters are shown in Table II.

Figure 5:
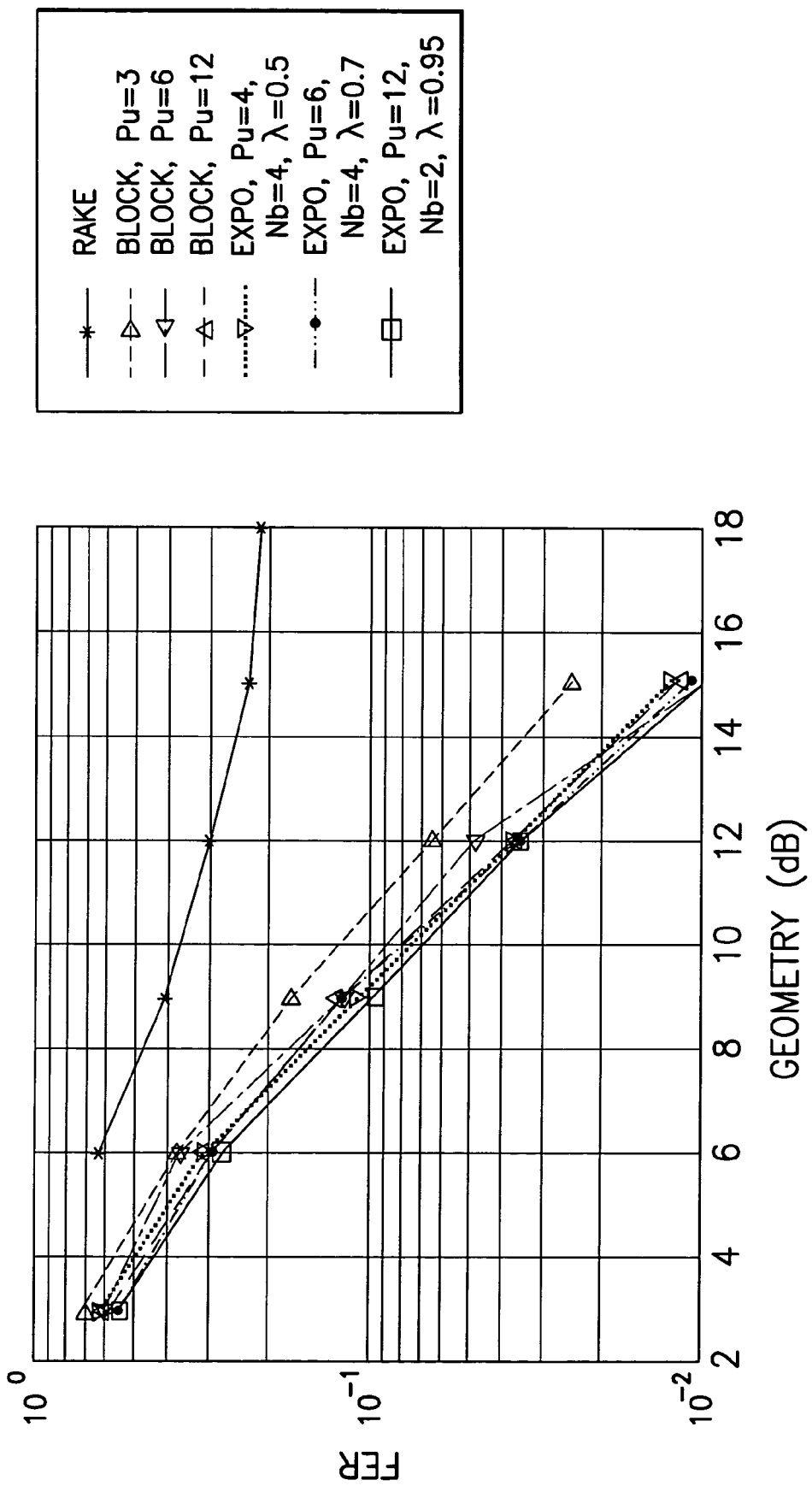
FIG. 5 illustrates: 1× EV-DV performances vs. receive SNR for the 2-path IS-98 channel with v=8 km/h.
Figure 6:
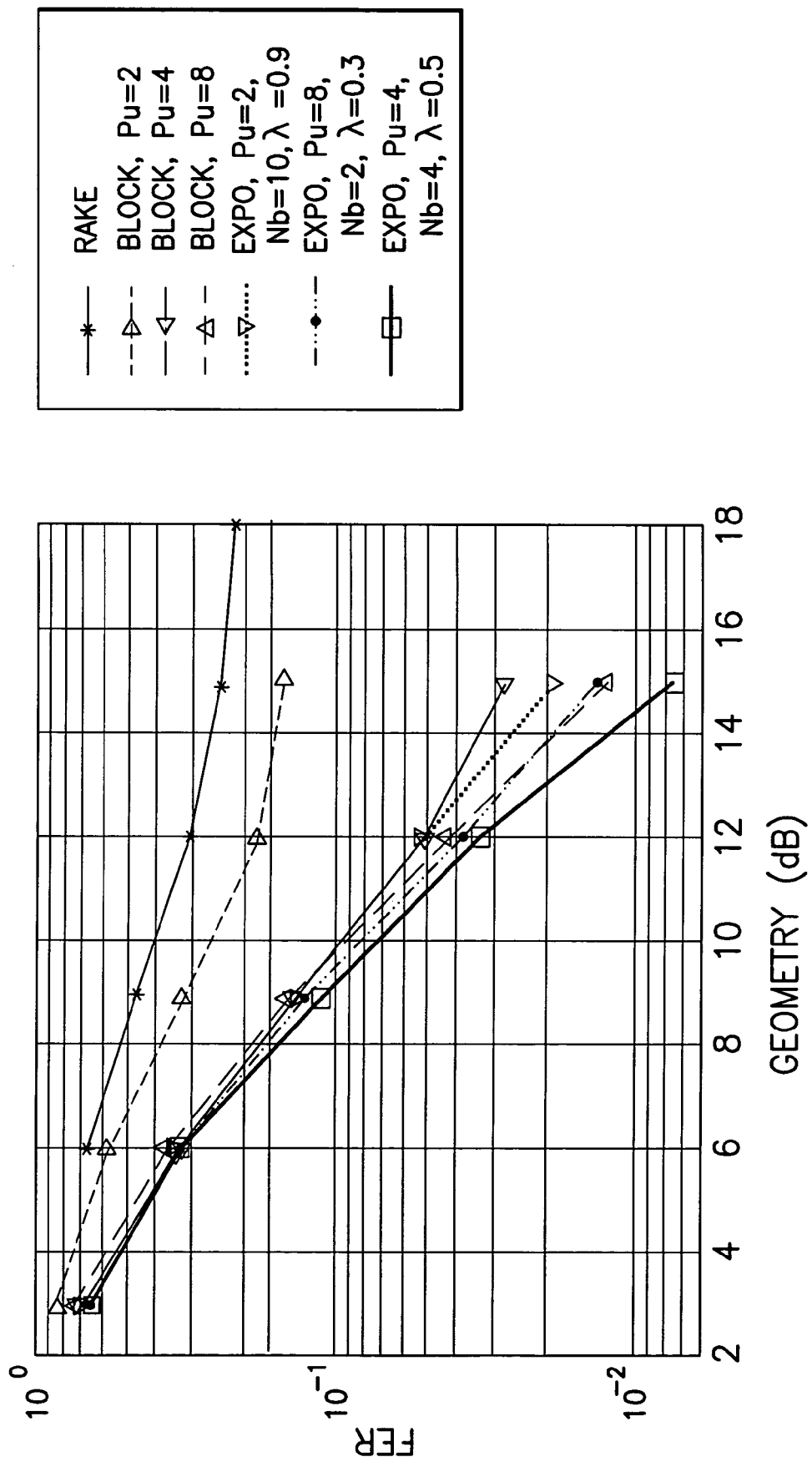
FIG. 6 illustrates: 1× EV-DV performances vs. receive SNR for the 2-path IS-98 channel with v=50 km/h.
Figure 7:
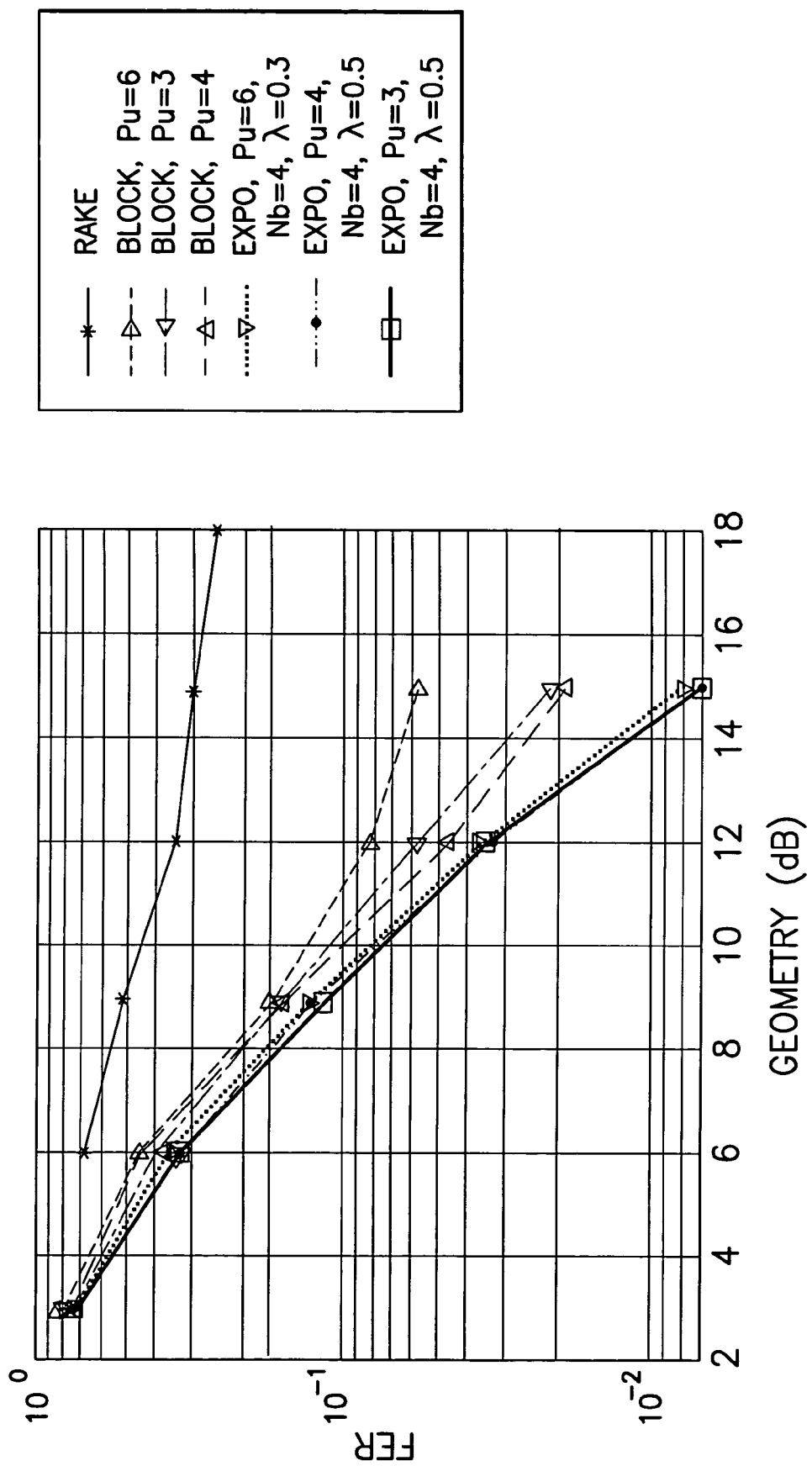
FIG. 7 illustrates: 1× EV-DV performances vs. receive SNR for the 2-path IS-98 channel with v=100 km/h.

From FIG. 5, where the vehicle speed is low, we see that the ordinary block LMMSE implementation (marked with "block") performs almost as well as the exponential form. In this implementation, the nth block is equalized by the filter synthesized from the data contained in the nth block only. We also see that the receiver performance is relatively insensitive to $P_u$. For medium to high speeds, FIGS. 6 and 7 show that the ordinary block implementation becomes more sensitive to the update period $P_u$. On the other hand, the exponential WAU method is relatively insensitive to $P_u$. We have also observed that the Rake receiver performs quite poorly under the 1× EV-DV standard.

In this respect, we point out that the advantage of the WAU is two-fold. In addition to the performance gain, many parameters can be held fixed for a wide range of mobile speeds. For instance, we see in FIGS. 5, 6 and 7 that the equalizer holds essentially its best performance when $P_u$, $N_b$, and $\lambda$ are held fixed at 4, 4, and 0.5, respectively, while the mobile speed is varied from 8 to 100 km/h.

TABLE II

1XEV-DV Simulation parameters

| | | | |
|---|---|---|---|
| Slot Format No. | 118 | DIR | −100 dB |
| Data rate | 163.2 kbps | Channel model | 2-tap IS-98 |
| Spreading gain | 32 | Mobile speed | 8, 50, 100 km/h |
| Chip rate | 1.2288 Mcps | Equalizer span | 21 chips |
| Total No. Walsh codes | U = 25 | Initial over sampling | 4 samples per chip |
| Desired Walsh codes | 3 | LMMSE over sampling | 2 samples per chip |
| Pilot power | 20% | User power distribution | Uniform over 25 Walsh codes |

The exponential form of the WAU filter is easy to implement and it represents only a small addition to the ordinary block-adaptive LMMSE equalizer structure. The simulation results show that the exponential WAU filter has a good performance over a wide range of mobile speeds and is substantially better than the Rake receiver. The exponential WAU method has a desirable feature that it is relatively insensitive to the update period. This feature allows for some flexibility in selecting a block size compatible with a given hardware computing speed. For instance, as the hardware computing speed increases, the update period can be decreased, allowing for more equalizer updates per unit time and decreasing the demodulation delay.

Under the 1× EV-DV standard without filtering delay, we have seen that when $P_u$, $N_b$, and $\lambda$ are held fixed, the equalizer still maintains a very flat performance over a wide range of mobile speeds. This feature represents an advantage of the present invention over the prior art that is important for hardware implementation, because online parameter changes usually require additional hardware complexity for parameter selection algorithms.

Although the invention has been described with respect to a limited number of embodiments, those skilled in the art will appreciate that other embodiments may be constructed within the spirit and scope of the following claims.

We claim:

1. A method of receiving a wireless code division multiple access signal from a base station comprising:
   receiving at least one received signal grouped in blocks of chips, the blocks being further grouped in slides, on at least one receive antenna;
   equalizing said received signal in a linear minimum mean squared error equalizer;
   updating said equalizer by estimating an auto-correlation matrix with a sample average of received signals over an update period, and passing said auto-correlation matrix through a multidimensional matrix filter that weights older sample data less than recent sample data; and
   processing the output of said equalizer to generate said wireless code division multiple access signal.

2. A method according to claim 1, further comprising a step of synthesizing said equalizer, including a cross-correlation matrix and an auto-correlation matrix, at the start of a block.

3. A method according to claim 2, further comprising a step of updating said equalizer by multiplying said auto-correlation matrix at a previous time with an update matrix and a hermitian conjugate thereof, said update matrix depending on an attenuation factor.

4. A method according to claim 3, in which said attenuation factor decreases in magnitude as a function of a time difference between said previous time and a current time.

5. A method according to claim 4, in which said attenuation matrix is a diagonal matrix multiplied by an exponential factor containing said time difference.

6. A method according to claim 1, wherein the multidimensional matrix filter comprises a nonsingular matrix whose spectral radius decreases with a tab index.

7. A method according to claim 6, in which said multidimensional matrix filter has the form of a diagonal matrix.

8. A method according to claim 7, further comprising a step of synthesizing said equalizer, including a cross-correlation matrix and an auto-correlation matrix, at the start of a block.

9. A method according to claim 8, further comprising a step of updating said equalizer by multiplying said auto-correlation matrix at a previous time with an update matrix and a hermitian conjugate thereof, said update matrix depending on an attenuation factor.

10. A method according to claim 9, in which said attenuation factor decreases in magnitude as a function of a time difference between said previous time and a current time.

11. A method according to claim 10, in which said attenuation matrix is a diagonal matrix multiplied by an exponential factor containing said time difference.

12. A system for receiving in a mobile terminal a wireless code division multiple access signal from a base station comprising:
   a transceiver for receiving at least one received signal grouped in blocks of chips, the blocks being further grouped in slides, on at least one receive antenna;
   a linear minimum mean squared error equalizer for equalizing said received signal;
   a signal processor for updating said equalizer by estimating an auto-correlation matrix with a sample average of received signals over an update period, and for passing said auto-correlation matrix through a multidimensional matrix filter that weights a plurality of older data samples less than recent data samples, where the number of weighted older data samples depends from a determined channel coherence interval, and for processing the output of said equalizer to generate said wireless code division multiple access signal.

13. A system according to claim 12, further comprising computation means for synthesizing said equalizer, including a cross-correlation matrix and an auto-correlation matrix, at the start of a block.

14. A system according to claim 13, further comprising means for updating said equalizer by multiplying said auto-correlation matrix at a previous time with an update matrix and a hermitian conjugate thereof, said update matrix depending on an attenuation factor.

15. A system according to claim 14, in which said attenuation factor decreases in magnitude as a function of a time difference between said previous time and a current time.

16. A system according to claim 15, in which said attenuation matrix is a diagonal matrix multiplied by an exponential factor containing said time difference.

17. An article of manufacture comprising a program storage medium readable by a computer, the medium embodying instructions executable by the computer for performing actions for receiving a wireless code division multiple access signal, the actions comprising:
    receiving at least one received signal grouped in blocks of chips, the blocks being further grouped in slides, on at least one receive antenna;
    equalizing said received signal in a linear minimum mean squared error equalizer;
    updating said equalizer by estimating an auto-correlation matrix with a sample average of received signals over an update period and passing said auto-correlation matrix through a multidimensional matrix filter that weights older sample data less than recent sample data; and
    processing the output of said equalizer to generate said wireless code division multiple access signal.

18. An article of manufacture according to claim 17, the actions further comprising:
    synthesizing said equalizer, including a cross-correlation matrix and an auto-correlation matrix, at the start of a block.

19. An article of manufacture according to claim 18, the actions further comprising:
    updating said qiualizer by multiplying said auto-correlation matrix at a previous time with an update matrix and a hermitian conjugate thereof, said update matrix depending on an attenuation factor.

20. An article of manufacture according to claim 19, in which said attenuation factor decreases in magnitude as a function of a time difference between said previous time and a current time.

21. An article of manufacture according to claim 20, in which said attenuation matrix is a diagonal matrix multiplied by an exponential factor containing said time difference.

22. A method of dynamically adjusting a filter in a receiver for changing channel conditions, comprising:
    receiving a first block of signals over at least one channel;
    estimating a first correlation matrix for the first block of signals once in an update period $P_1$, said first correlation matrix correlating data from a total of $n_1$ blocks of signals;
    equalizing the first block of signals using the first correlation matrix;
    receiving a second block of signals over the at least one channel;
    determining that a coherence interval between the second block of signals and a block of signals received immediately prior to the second block of signals is shorter than a coherence interval between the first block of signals and a block of signals received immediately prior to the first block of signals;
    estimating a second correlation matrix for the second block of received signals once in an update period $P_2$, said second correlation matrix correlating data from a total of $n_2$ blocks of data, where $P_2$ is shorter than $P_1$ and $n_2$ is greater than $n_1$; and
    equalizing the second block of signals using the second correlation matrix.

* * * * *

UNITED STATES PATENT AND TRADEMARK OFFICE
CERTIFICATE OF CORRECTION

PATENT NO. : 7,443,909 B2 Page 1 of 1
APPLICATION NO. : 11/020055
DATED : October 28, 2008
INVENTOR(S) : Hoang Nguyen et al.

It is certified that error appears in the above-identified patent and that said Letters Patent is hereby corrected as shown below:

In Claim 5: Column 10, line 27, delete "attenuation" and replace with --update--.

In Claim 11: Column 10, lines 46-47, delete "attenuation" and replace with --update--.

In Claim 16: Column 11, lines 13-14, delete "attenuation" and replace with --update--.

Signed and Sealed this

Twenty-second Day of June, 2010

David J. Kappos
*Director of the United States Patent and Trademark Office*